(12) United States Patent
Blum et al.

(10) Patent No.: US 8,228,847 B2
(45) Date of Patent: Jul. 24, 2012

(54) MULTIHOP RADIO HAZARD REPORTING SYSTEM

(75) Inventors: Philipp Blum, Luzern (CH); Andreas Meier, Adliswil (CH); Mario Strasser, Bischofszell (CH)

(73) Assignee: Siemens Aktiengesellschaft, Munich (DE)

( * ) Notice: Subject to any disclaimer, the term of this patent is extended or adjusted under 35 U.S.C. 154(b) by 309 days.

(21) Appl. No.: 12/594,709

(22) PCT Filed: Apr. 3, 2008

(86) PCT No.: PCT/EP2008/054060
§ 371 (c)(1),
(2), (4) Date: Jan. 7, 2010

(87) PCT Pub. No.: WO2008/122590
PCT Pub. Date: Oct. 16, 2008

(65) Prior Publication Data
US 2010/0110924 A1 May 6, 2010

(30) Foreign Application Priority Data
Apr. 5, 2007 (EP) ..................................... 07105778

(51) Int. Cl.
*H04W 4/00* (2009.01)
(52) U.S. Cl. ....................................................... 370/328
(58) Field of Classification Search .......... 370/252–256, 370/328–350, 408; 709/222–224, 238, 240
See application file for complete search history.

(56) References Cited

U.S. PATENT DOCUMENTS

| | | | | |
|---|---|---|---|---|
| 6,044,062 A | * | 3/2000 | Brownrigg et al. | 370/238 |
| 7,027,416 B1 | * | 4/2006 | Kriz | 370/328 |
| 7,551,936 B2 | | 6/2009 | Schropp et al. | |
| 2006/0013154 A1 | | 1/2006 | Choi et al. | |
| 2006/0133328 A1 | * | 6/2006 | Levendel et al. | 370/338 |

FOREIGN PATENT DOCUMENTS

| | | |
|---|---|---|
| EP | 1282094 A2 | 2/2003 |
| EP | 1507244 A1 | 2/2005 |
| WO | 9917477 A2 | 4/1999 |

* cited by examiner

*Primary Examiner* — Frank Duong
(74) *Attorney, Agent, or Firm* — Laurence A. Greenberg; Werner H. Stemer; Ralph E. Locher

(57) ABSTRACT

A method and a system for the propagation of a message in a radio-operated communication network having a base unit and a plurality of members, wherein the base unit and the members each includes a transmitter and a receiver, the receiver being activated at cyclical switch-on times for a certain respective receiving period. A message to be sent from a member to the base unit is transmitted by the member to at least one adjacent member as a function of at least one rule, and the message is transmitted by the at least one adjacent member, according to the at least one rule, to at least one member adjacent thereto, in the direction of the base unit. The process is repeated such that the message is transmitted from at least one adjacent member receiving the message according to the at least one rule to at least one member adjacent thereto, in the direction of the base unit. The message is transmitted from the at least one member that is adjacent to the base unit to at least the base unit.

31 Claims, 5 Drawing Sheets

MULTIHOP RADIO HAZARD REPORTING SYSTEM

BACKGROUND OF THE INVENTION

Field of the Invention

The invention relates to a method and a system for propagating a message in a radio-operated communication network comprising a base unit and a plurality of nodes, wherein the base unit and the nodes in each case have a transmitter and a receiver and wherein the receiver is activated at cyclical switch-on times for a specific receiving time period in each case.

Radio-based or radio-operated hazard reporting systems comprise warning sensors in a radio cell as nodes of the hazard reporting system which in the event of a detected hazard (fire, break-in etc.) transmit a hazard warning over a radio link to a control center. In this scenario the warning can be transmitted directly to a hazard warning control center (in that case the hazard reporting system has only one radio cell) or via nodes, for example hazard warning units, such as for example fire alarms, intruder alarms, gas leak detectors, acoustic alarm units, optical alarm units, optoacoustic alarm units etc. of the hazard reporting system. Radio-based hazard reporting systems of said type are referred to as so-called multihop radio hazard reporting systems when there are nodes that are not connected directly to the control center. Messages are then propagated along communication paths or transmission paths. Basically, a multihop hazard reporting system is referred to as connected when at least one communication path exists between each pair of nodes.

If the control center has received a message from a node, further measures (alerting the fire department or the police) can be initiated for example in order to deal with the hazard.

In this case the warning sensors include a transmitting and receiving device and ideally are designed to be operated autonomously, in other words powered by a battery and not by means of a cable connection to a power supply grid, to allow their deployment at inaccessible locations. To that end all the components of the warning sensor should be embodied as maximally power-saving, and in addition the components should be switched on only at certain times and not be permanently in operation. The battery life should be greater than five years, for example. Other nodes, such as for example control panels, optical, acoustic, optoacoustic alarm units etc. should be able to communicate with the control center or with intermediate stations via a radio transmission and therefore must be designed as correspondingly power-saving like the warning sensors.

Basically it is important that every node can communicate messages quickly and reliably to the base unit. In particular it must be ensured that a node can reliably report a detected hazard to the base unit. It is not necessary in this case for the sending node and the base unit to be adjacent, i.e. a message can be relayed to the destination via possibly a plurality of nodes, or as the case may be, intermediate stations. This function is typically referred to as routing.

A routing method is characterized as reliable if a message also reaches its destination even when one or more nodes of the radio-operated hazard reporting systems fail or the communication between two or more adjacent nodes is disrupted. This is not, of course, possible in every case, but only as long as a communication path exists between source and destination unit. If such a communication path, or as the case may be, transmission path exists, a reliable routing method should be able to transport the message to the destination station with a high degree of probability.

The transit time of a message in a multihop system is basically determined by the number of intermediate stations on the shortest communication path between source and destination unit, as well as by the average transmission time between two adjacent nodes. The average transmission time between two adjacent nodes is mainly determined by the length of the inactive phase of the nodes. A routing method is characterized as fast if the transit time is generally less than or never significantly exceeds the above-described transit time.

Two message transmission approaches are known in known multihop radio systems:

With the first approach, the reception of a message is acknowledged by the destination unit, i.e. an acknowledgement message is in turn sent via a plurality of nodes to the sending node. If the message or its acknowledgement does not arrive, the sending node retransmits the message. Depending on the embodiment of the method, the same or to some extent different nodes are used in this case. The disadvantage of methods of this kind is that both the acknowledgement and the retransmission of the message, and possibly also the determining of new intermediate units, takes time. Such methods are reliable, but slow in fault situations.

With the second approach, different paths (sequences of intermediate units) are used from the outset for transmitting a message. Accordingly, the message also reaches the destination unit even if a limited number of intermediate units fail or the communication between adjacent nodes is disrupted. A possible embodiment variant of this approach is known as flooding. In this scenario a message is forwarded in each case to all adjacent nodes, which substantially increases the energy consumption of the radio-operated system.

The transmission time for sending a message increases directly in proportion to the number of intermediate units, since a message cannot be forwarded until it has been received in its entirety. The transmission time can therefore be reduced by using as short a path as possible, i.e. a minimum number of intermediate stations are involved. This is possible if use is made of links between nodes that are adjacent to, but geographically as remote as possible from one another. However, such links are typically more prone to faults than others, thereby resulting in communication which, though fast, is not reliable.

BRIEF SUMMARY OF THE INVENTION

The object of the present invention is to be seen in proposing a solution for the fastest possible reliable, yet energy-efficient transmission of messages in a radio-operated hazard reporting system.

The object is achieved according to the invention in each case by means of the subject matter of the respective independent claims. Developments of the invention are set forth in the dependent claims.

A core of the invention is to be seen in the fact that in a radio-operated communication network a message that is to be sent by a node to a base unit is transmitted by the sending node to at least one adjacent node as a function of at least one rule. The at least one adjacent node in turn transmits the message in accordance with the at least one rule in the direction of the base unit to at least one of its adjacent nodes.

This operation is repeated accordingly such that every node receiving the message transmits the message in turn to at least one of its nodes. When the message is received by at least one node located adjacent to the base unit, said node transmits the message to the base unit.

A radio-operated communication network has at least one base unit and a plurality of nodes. In such an arrangement the base unit and the nodes in each case possess a transmitter and a receiver, the receiver being activated at cyclical switch-on times for a specific receiving time period in each case. In order to transmit the message in a radio-operated communication network, each node sends at least one item of information relating to the switch-on time of the node to the directly adjacent nodes. A node's switch-on time information is used in accordance with a rule, with the message being sent to the at least one node that has the earliest possible switch-on time.

Generally a hazard warning control center is used as the base unit, since for example hazards must typically be reported quickly and reliably to a hazard warning control center.

According to the invention a further rule for message transmission can be the use of a node's communication level. In this case each node classifies its adjacent nodes into, for example, three groups. An adjacent node is either closer to the base unit (Parent), as a result of which it is assigned to the group "local". Or it is "equally far" (Peer) away from the base unit or the adjacent node is further away "remote" (Child). Of course, any divisions into relevant groups are conceivable for the method according to the invention.

In order therefore to be able to complete the classification of the adjacent nodes into "Parents", "Peers" and "Children", the nodes must know their distance from the base unit (without restricting the generality of the method it is always assumed in the following that the base unit acts as destination for a message that is to be sent). In order to set up this information, known methods for constructing a so-called Shortest Path Tree (SPT) can be used, for example. In this case all the nodes set the distance to the base unit initially to a very high value, for example. The base unit now starts sending a signaling message containing a parameter (value) with the analogous content "Level=1" to all adjacent nodes. The nodes receiving such a signaling message set their distance to the received value (i.e. 1) and in turn send a signaling message with the content "Level=2", i.e. the next higher value, to all nodes adjacent to them. Whenever a node receives a signaling message containing a value that is lower than the currently stored communication level, or as the case may be, distance to the base unit, said communication level is stored and the adjacent nodes are notified accordingly by means of a signaling message containing the parameter that represents the next higher communication level. In the other case, i.e. the received value is equal to or greater than the currently stored communication level, the signaling message is ignored and discarded.

According to the invention a message is then sent in accordance with the at least one rule only to those nodes that have a lower and/or an equally high communication level. The lower communication level is to be seen in relation to the communication level of the sending node. The node with a lower communication level is determined in that the sending node compares its own communication level with the communication level of its adjacent nodes, which communication level it knows on account of the exchanged signaling messages.

A further rule of the method specifies the order in which the selected "Parents" and "Peers" are addressed. The described switch-on times of the adjacent nodes are used for that purpose. The switch-on times can be used for example as a secondary ordering criterion, but also as a primary ordering criterion. In other words, "Parents" are addressed first, and then "Peers". If a plurality of parents (or peers) are available for selection, they are addressed in the order of wakeup times.

According to the inventive method a message that is to be sent can be sent by one node to a plurality of adjacent nodes, with a single adjacent node being addressed in each case. Nodes receiving the message can forward the latter in turn according to the inventive method to a plurality of adjacent nodes. In this way it is ensured that the message reaches the base unit at least once.

It holds as one of the most important rules that "Parents" take precedence over "Peers" because they possess a shorter communication path, or as the case may be, transmission path to the base unit. "Children" are not used as a rule, as otherwise the message moves away from its destination.

A further rule can specify that nodes never forward a hazard warning to an adjacent node from which said message was received.

In principle a node can also receive the same message more than once. In this case the message is forwarded only upon being received the first time; subsequently received copies of the message are ignored.

The method according to the invention can also be embodied in such a way that an acknowledgement is given for each communication between adjacent nodes, i.e. the reception of the message is confirmed by means of a signaling message. If no acknowledgement or, as the case may be, confirmation is received, the sending node must assume that the message has not been correctly received. In order to obtain a satisfactory reliability nonetheless, a node can now transmit the message to additional "Parents" and/or "Peers". The following rules apply in this case:

a) An adjacent node that has not acknowledged the receipt of the message is not addressed again until all other "Parents" and "Peers" have been addressed and said at least one transmission attempt was either unsuccessful or only partially successful, i.e. that at least one adjacent node has sent back no confirmation.

b) The nodes having a low communication level "Parents" are given precedence over the nodes having a higher communication level "Peers" only for the first pass of the transmission attempt; thereafter only the switch-on times are still used.

c) If a node acknowledges the receipt of the message, it will not be addressed any further.

d) The maximum number of transmission attempts is a selectable parameter or value.

During each communication with a node the different parameters or, as the case may be, the different rules can be transmitted in the form of a signaling message from the base unit. The node stores the parameters and the rules and applies them as necessary.

The classification of the nodes into communication levels such as, for example, "Parents", "Peers" and "Children" can also be used to transmit messages efficiently from the base unit to the nodes. In this case the adjacent nodes are selected as follows:

a) A message is sent to all nodes having a high communication level, for example "Children".

b) The order of the transmission to the nodes having a high communication level "Children" among one another is determined according to their switch-on times.

c) Depending on the desired reliability, nodes having a lower communication level, for example "Peers", can also be used in addition.

An advantage of the method according to the invention resides in the fact that an event, such as an alarm for example, can be quickly and reliably reported to a base unit via a plurality of nodes. Particularly marked is the speed advantage over such systems in which the nodes are available only periodically for the communication rather than permanently.

A further advantage of the method consists in its reliability in the sense that the system also transmits a message reliably from a node to the base unit when one or more nodes, excluding, of course, the node originally sending the message and the base unit, are not in operation or, as the case may be, one or more adjacent nodes are temporarily unable to communicate with one another. This means that the method according to the invention has significant advantages over the usual routing methods via a route specified a priori. A "conventional" routing method of such kind can be embodied more reliably if a new route is searched for dynamically when problems occur, although a dynamic method of this kind requires very much more time for the transmission of a message.

Through the use of the method according to the invention it is possible to achieve a high level of reliability with at the same time low consumption of energy.

BRIEF DESCRIPTION OF THE SEVERAL VIEWS OF THE DRAWING

The invention is explained in more detail with reference to an exemplary embodiment represented in a figure, in which.

DESCRIPTION OF THE INVENTION

Figure 1:
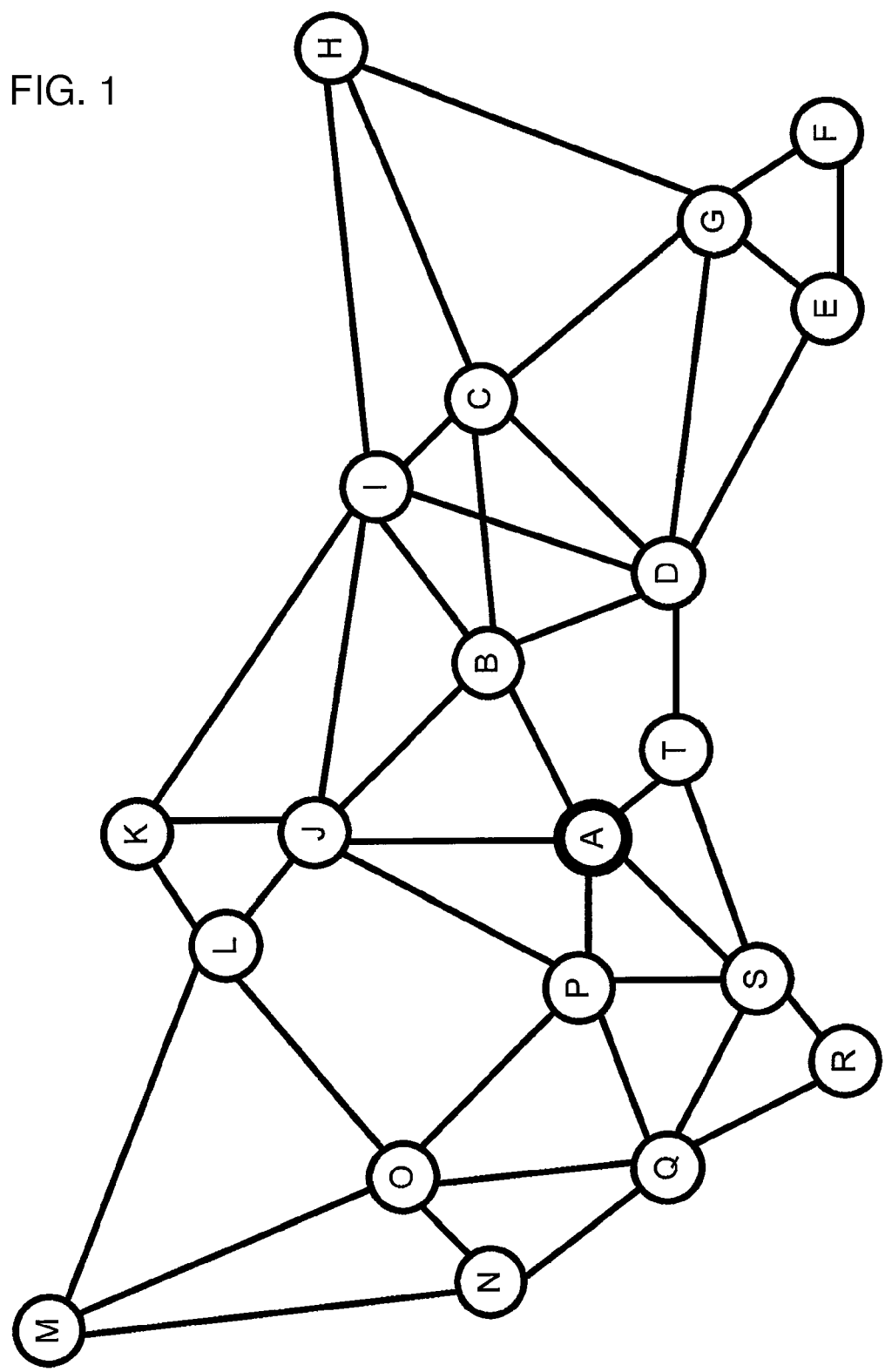
FIG. 1 shows a typical example of a multihop radio hazard reporting system.

FIG. 1 shows a typical example of a multihop radio hazard reporting system, wherein said system has a base unit A and a plurality of nodes B to T.

Figure 2:
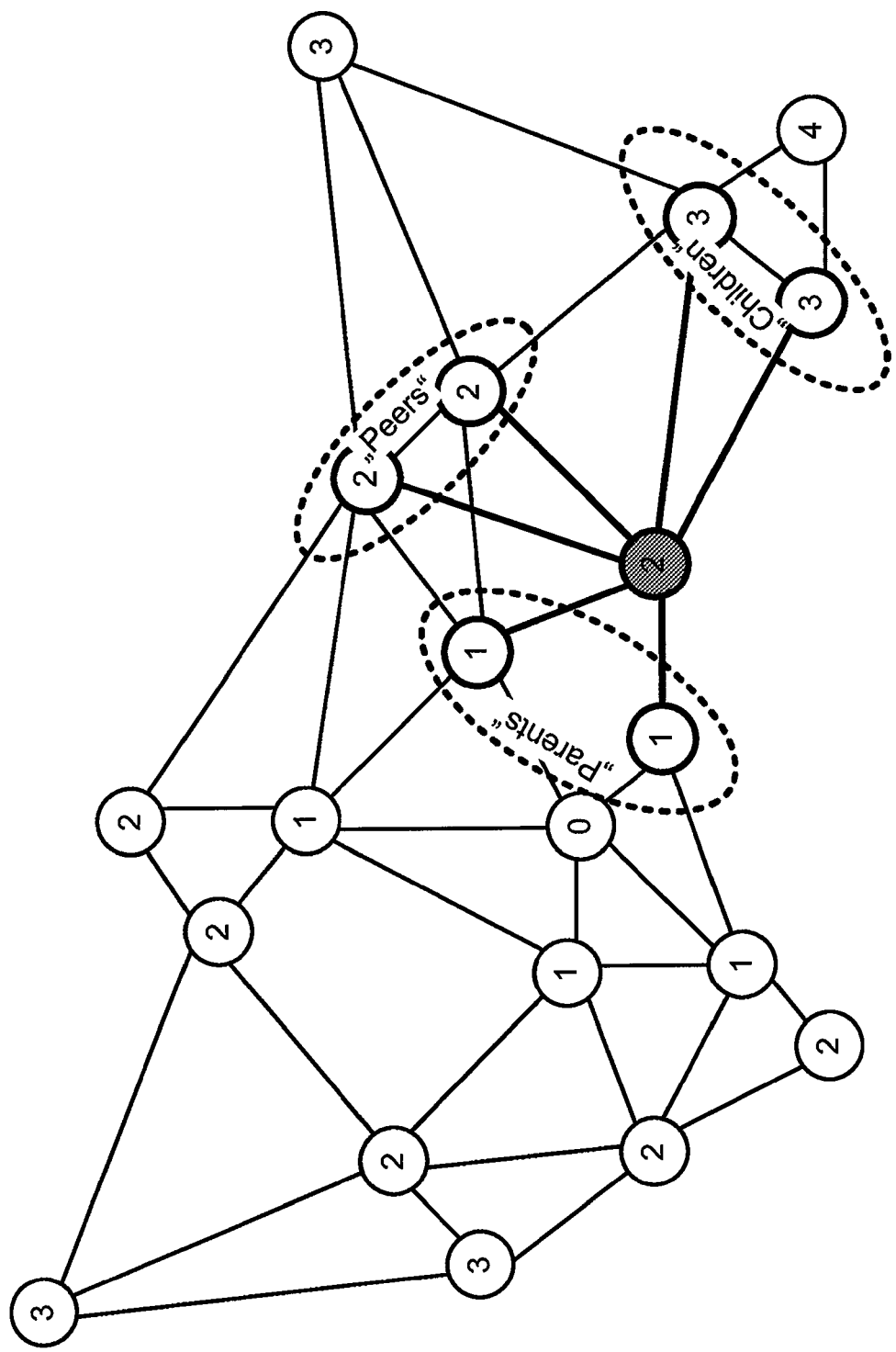
FIG. 2 shows a multihop radio hazard reporting system in which the nodes are classified into communication levels.

FIG. 2 shows a multihop radio hazard reporting system in which the nodes are classified into communication levels 0, 1, 2, 3, 4. The base unit A has the communication level 0. The directly adjacent nodes T, B, J, P, S have the communication level 1. The communication level specifies the minimum number of nodes between the node and the base unit. The dark-highlighted node D has the distance or, as the case may be, communication level 2 (an intermediate unit) to the base unit A, and consequently two local nodes T, B having communication level 1 (Parents), two equally distant nodes I, C having communication level 2 (Peers), and two remote nodes G, E having communication level 3 (Children). The nodes B, T, J, P, S that are connected directly to the base unit A, i.e. are adjacent, have the communication level 1 and consequently the distance 1 to the unit A.

Figure 3:
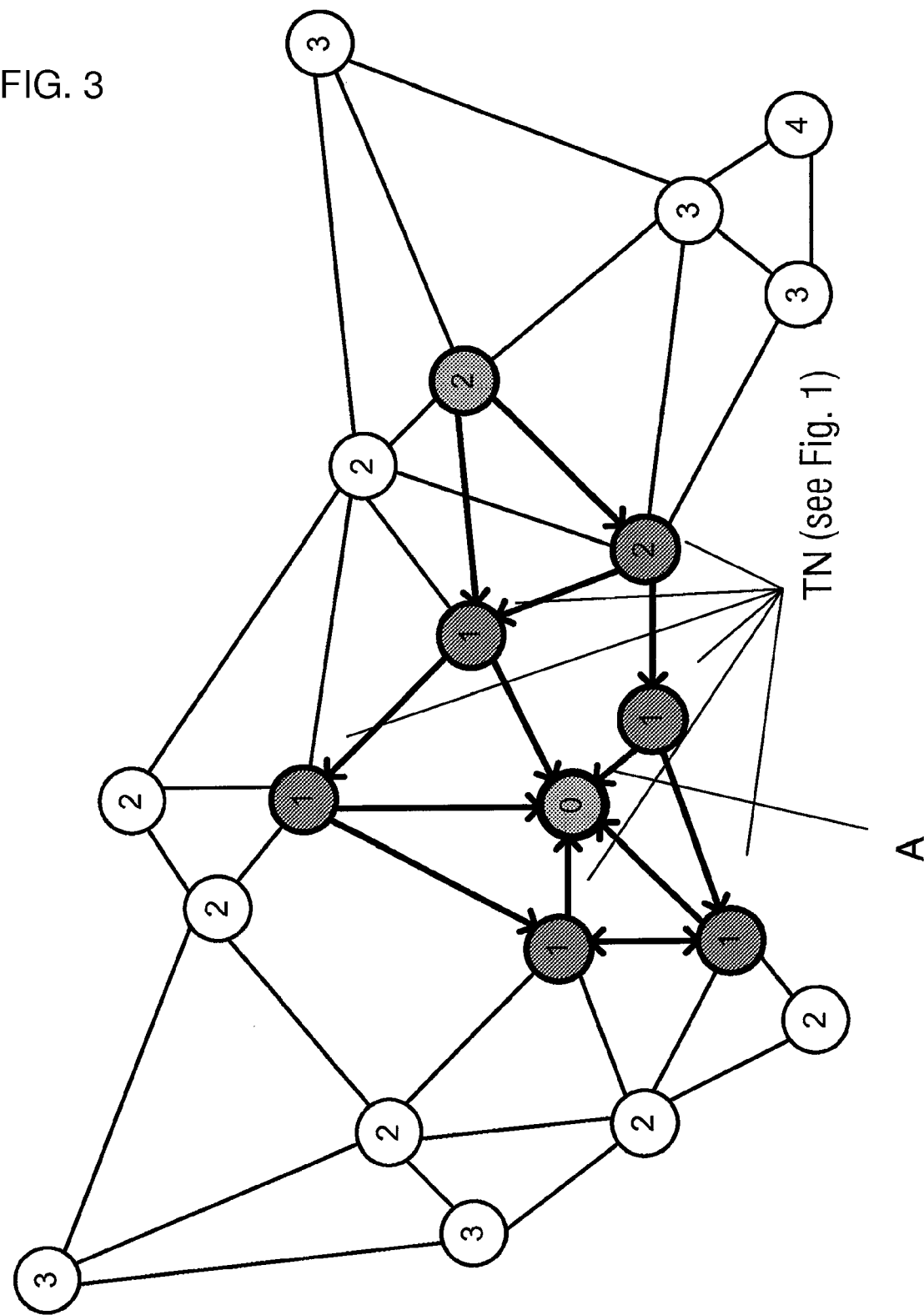
FIG. 3 shows a message being sent in a multihop radio hazard reporting system classified according to FIG. 2.

FIG. 3 shows a message being sent in a multihop radio hazard reporting system classified according to FIG. 2 having the designation of the nodes according to FIG. 1. The node C generates a hazard warning for the base unit A. The node C sends said message to its only "Parent"—node B—and additionally to a "Peer"—node D. The node B routes the message to the base unit A, as well as to the node J. The node D sends the message to the two "Parents" nodes B and T, etc. The nodes involved in the sending of the message are highlighted in dark. The communication links used are drawn in bold.

In accordance with a rule a node in this case never sends the message back to the node from which it received the message. In this example the node J sends the message to the base unit A and to the node P and not to the node B, since the message was received from the node B. In this scenario a message can be a signaling message, an alarm message, a message relating to the exchange of payload data etc.

If a node B receives the message from a plurality of nodes, in this case the nodes C and D, the node B nonetheless forwards the message only once to the nodes A and J, in accordance with a rule.

Each node J, B, D, T, S, P involved in the message transmission transmits the message to two adjacent nodes J, B, D, T, S, P. This ensures that the method according to the invention is rendered reliable in relation to failures of individual nodes or a disrupted communication between adjacent nodes. The number of adjacent nodes J, B, D, T, S, P requiring to be notified can be determined with the aid of a parameter k. Higher values of k lead to increased reliability, albeit also at the cost of correspondingly increased energy consumption, since more messages are sent. Notifying two adjacent nodes J, B, D, T, S, P has proved advantageous since in this way a high level of reliability is already achieved at relatively small cost in terms of energy consumption.

Figure 4:
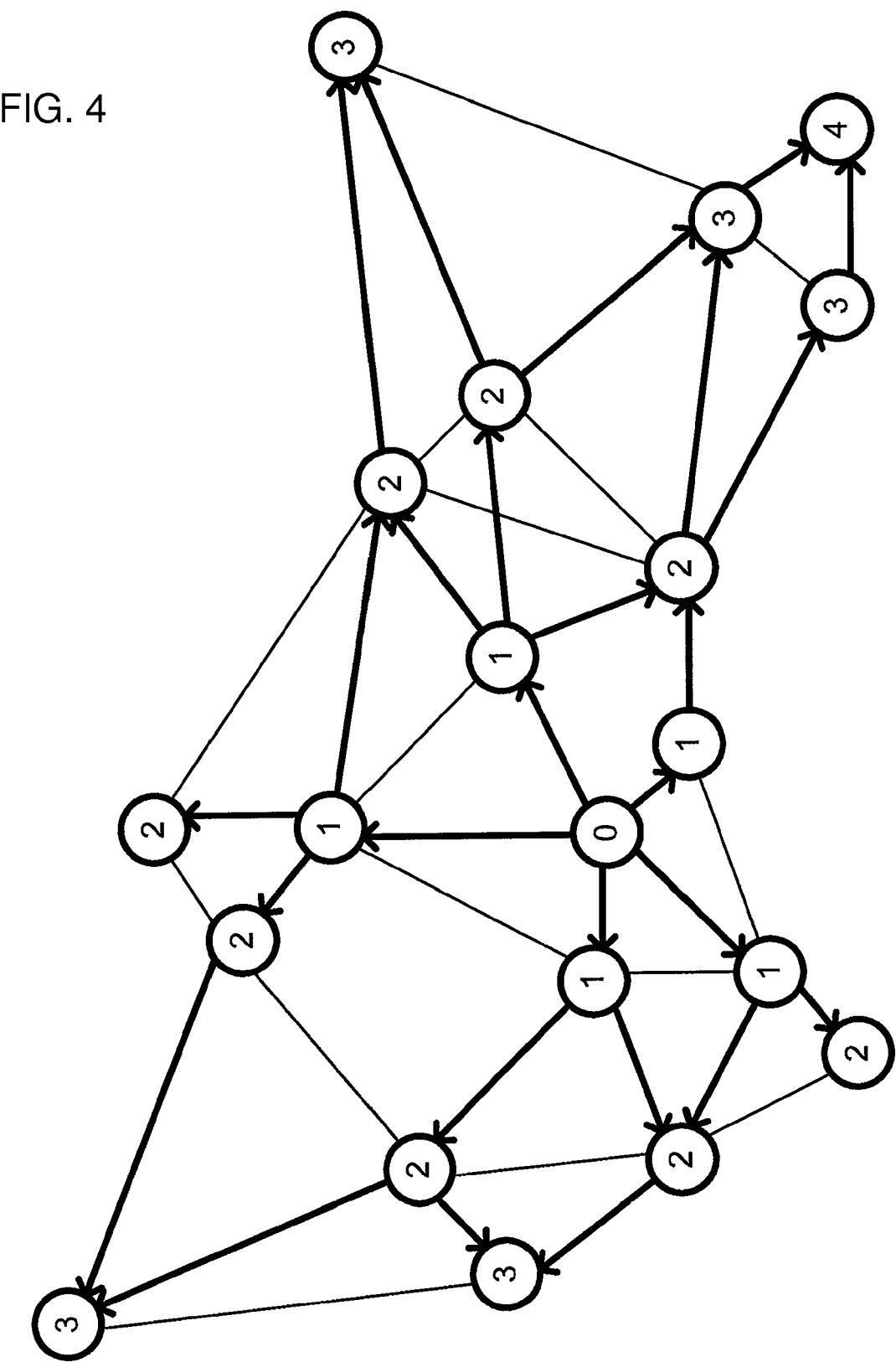
FIG. 4 shows the sending of a message from the base unit to the nodes.

FIG. 4 shows an example of the sending of a message from the base unit to the nodes B-T. In this case a message is sent to the nodes B-T. Nodes E, G having a high communication level (Children) evaluate said message. The nodes D, I, C, K, L, R, Q, O, for example, discard said message. In this way all the nodes B to T can be reached. However, this is only ensured if each planned transmission is also successful. Owing to the method according to the invention the message can nevertheless be transmitted to the destination node even though nodes in the communication network have failed.

Figure 5:
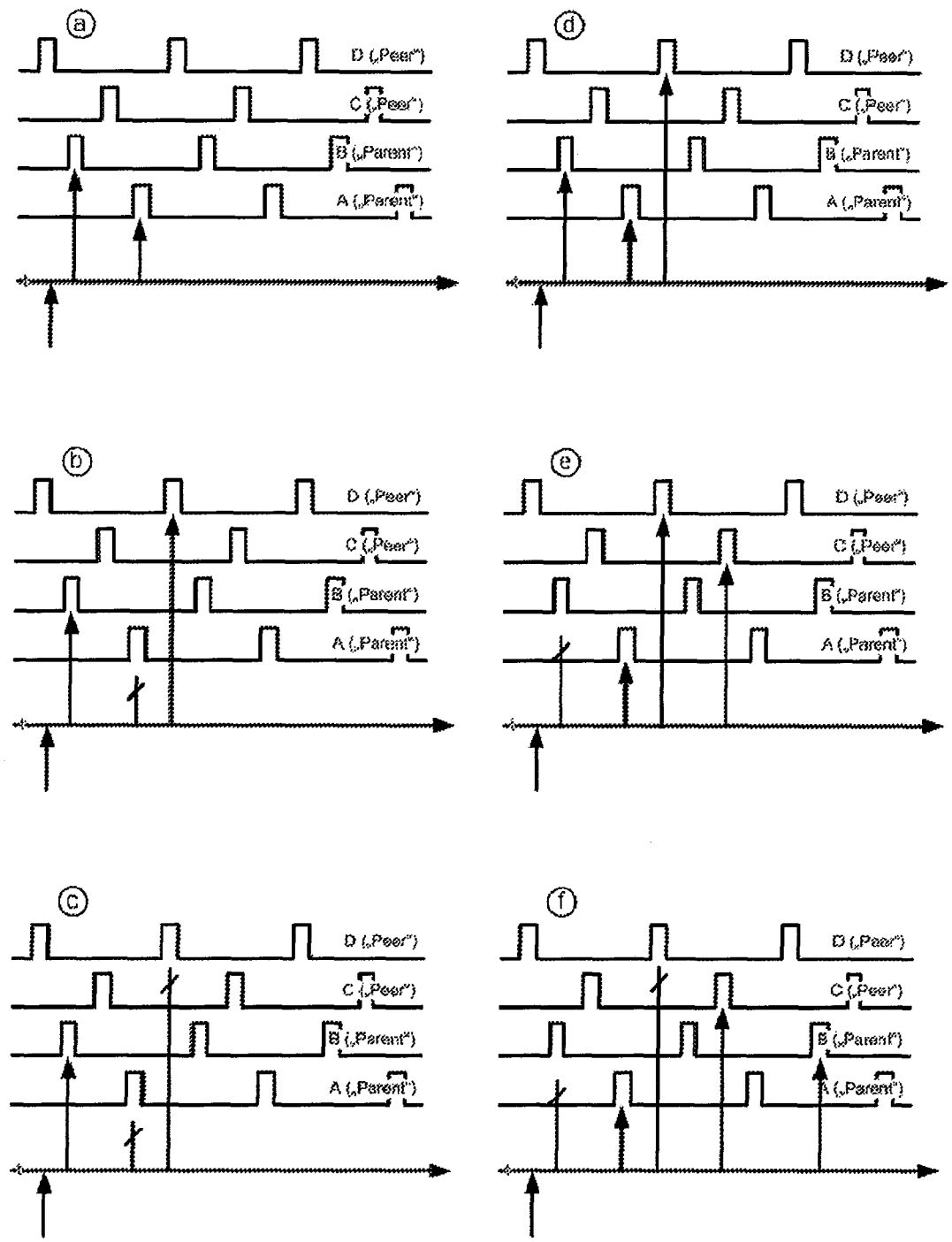
FIG. 5 shows the sending of a message from the viewpoint of a node.

FIG. 5 shows the sending of a message from the viewpoint of a node according to the following examples:

a) A message is transmitted to a total of two adjacent nodes. Since two "Parents" nodes A, B are available, the message is not sent to a "Peer" node C, D. The "Parent" node B is used in preference to the "Parent" node A because at the time of the message transmission the "Parent" node B has an earlier switch-on time than the "Parent" node A.

b) The message is sent to the "Parent" node B because the latter has the earliest possible switch-on time. At the time of the message transmission to the "Parent" node the sending node receives no confirmation that the message has been received by the "Parent" node A. The sending node therefore transmits the message alternatively to the "Peer" node D.

c) The message is again transmitted to the "Parent" node B having the earliest possible switch-on time. The message transmission attempt to the "Parent" node A and the "Peer" node fails, because they do not confirm the receipt of the message. In this example the number of attempts is limited to one attempt, with the result that the message has only been transmitted to the "Parent" node, since the transmission attempt to the other adjacent nodes A, D failed.

d) In this example the message is transmitted to a total of three adjacent nodes B, A, D; in addition to the "Parents" nodes A and B the message is also sent to a "Peer" node D. The "Peer" node D is selected for the message transmission because at the time of the sending of the message to the two "Parents" nodes A, B the "Peer" node D has the other earliest possible switch-on time. The order of the message transmission is therefore B-A-D and not B-C-A, since in this example the switch-on times are only taken into account secondarily. Primarily, the "Parents" nodes B, A are chosen for transmitting the message.

e) In this example the "Parent" node B does not confirm the receipt of the message. The nodes are thereupon notified in the order A-D-C. The node C is notified because a further transmission attempt to the node B will only take place when a transmission attempt has taken place for all the other adjacent nodes.

f) The node B, to which the message was transmitted first on account of its switch-on time, does not confirm the receipt of the message. A transmission attempt thereupon takes place to all the adjacent nodes A, D, C. The message transmission is successful in the case of the nodes A and C. As in the case of node B the node D likewise does not confirm the receipt of the message. Once at least one attempt to transmit the message has taken place in the case of all adjacent nodes, a further attempt to transmit the message is made in the case of node B. This time the transmission attempt results in success and node B confirms the receipt of the message.

The invention claimed is:

1. A method for transmitting a message in a radio-operated communication network having a base unit and a plurality of nodes, wherein the base unit and the nodes each has a transmitter and a receiver, the method which comprises:
   activating the receiver at cyclical switch-on times for a specific receiving time period in each case;
   transmitting a message to be sent from a node to the base unit by the node to at least one adjacent node as a function of at least one rule;
   in accordance with the at least one rule, transmitting the message from the at least one adjacent node in a direction of the base unit to at least one respectively adjacent node;
   in accordance with the at least one rule, transmitting the message in each case from the at least one respectively adjacent node having received the message in the direction of the base unit to at least one of its respectively adjacent nodes; and
   transmitting the message at least to the base unit from at least one node that is adjacent to the base unit.

2. The method according to claim 1, which comprises sending at least one item of information relating to a switch-on time of the node from each node to the respectively adjacent nodes.

3. The method according to claim 1, which comprises using the switch-on time of the node as at least one rule.

4. The method according to claim 3, which comprises transmitting the message from the node to the adjacent node having the earliest possible switch-on time.

5. The method according to claim 1, wherein the nodes are assigned to different communication levels in relation to the base unit.

6. The method according to claim 1, which comprises using the communication level of a node as at least one rule.

7. The method according to claim 1, which comprises determining the shortest distance from a node to the base unit in order to identify the communication level of the nodes.

8. The method according to claim 7, which comprises determining a shortest transmission path by:
   sending a signaling message containing at least one parameter from the base unit to the adjacent nodes;
   storing a communication level as a function of the parameter by the nodes receiving the signaling message;
   sending a further signaling message containing a further parameter by the nodes to their adjacent nodes; and
   storing a further communication level as a function of the further parameter by the nodes receiving the further signaling message; and
   continuing the sending and storing steps until all the nodes have been assigned a communication level corresponding to the shortest transmission path between the node and the base unit.

9. The method according to claim 8, wherein the parameter in the signaling message specifies the number of nodes between the node and the base unit.

10. The method according to claim 8, which comprises, by the node receiving a signaling message containing a parameter, comparing the parameter in the signaling message with an already received parameter.

11. The method according to claim 10, which comprises discarding the signaling message containing the parameter if the value of the parameter is greater than an already received parameter.

12. The method according to claim 1, which comprises, in accordance with a rule, sending the message by a node to the base unit along a shortest transmission path.

13. The method according to claim 7, which comprises forwarding the message in accordance with a rule by the at least one node sending the message to at least one node having a lower communication level.

14. The method according to claim 13, which comprises identifying the at least one adjacent node having a lower communication level by the sending node by comparing its own communication level.

15. The method according to claim 1, wherein the base unit is at least one of a hazard warning control center and a hazard warning unit.

16. The method according to claim 1, wherein the nodes are hazard warning units.

17. The method according to claim 11, wherein the base unit is at least one hazard warning control center selected from the group consisting of a fire alarm control center, an intruder alarm control center, and a gas alarm control center.

18. The method according to claim 15, wherein the hazard warning unit is at least one unit selected from the group consisting of a fire alarm, an intruder alarm, a gas leak detector, an acoustic alarm unit, an optical alarm unit, a surveillance camera, and an optoacoustic alarm unit.

19. The method according to claim 1, wherein the message is selected from the group consisting of an alarm message, a signaling message, and a message relating to an exchange of payload data.

20. The method according to claim 1, wherein at least one rule specifies the number of adjacent nodes to which the message is to be transmitted.

21. The method according to claim 20, which comprises specifying a number of adjacent nodes that are to receive the message by way of a parameter stored at the node.

22. The method according to claim 1, which comprises transmitting a message only once from one node to at least one adjacent node.

23. The method according to claim 1, which comprises confirming a receipt of the message by the adjacent node to the sending node.

24. The method according to claim 23, wherein the message is not retransmitted to an adjacent node that has not confirmed the receipt of the message until at least one attempt to transmit the message to at least one other adjacent node was unsuccessful or only partially successful.

25. The method according to claim 23, which comprises giving adjacent nodes having a lower communication level precedence over the nodes having a higher communication level only during a first transmission attempt.

26. The method according to claim 23, which comprises, during a second transmission attempt, transmitting the message to the adjacent nodes as a function of their switch-on times.

27. The method according to claim 23, which comprises transmitting the message only to those adjacent nodes that have not yet sent a confirmation to the sending node.

28. The method according to claim 23, wherein a parameter stored at the sending node specifies the number of transmission attempts that are to be made.

29. The method according to claim 1, which comprises transmitting the message to be sent from the base unit to at least one node to nodes having a high communication level.

30. The method according to claim 29, which comprises determining an order of the transmission to the nodes having a high communication level according to the switch-on times of the nodes.

31. A system for transmitting a message in a radio-operated communication network, comprising:

a base unit and a plurality of nodes, each of said base unit and said nodes having a transmitter and a receiver, and said receiver is activated at cyclical switch-on times for a specific receiving time period in each case;

said nodes including:

a node for transmitting a message to be sent from said node to said base unit to at least one respectively adjacent node as a function of at least one rule;

said at least one adjacent node configured to transmit the message in the direction of said base unit in accordance with the at least one rule to at least one adjacent node respectively adjacent thereto;

said at least one adjacent node receiving the message for transmitting the message in accordance with the at least one rule in the direction of the base unit to at least one adjacent node respectively adjacent thereto; and at least one node directly adjacent to said base unit and configured to transmit the message at least to said base unit.

* * * * *